United States Patent [19]

Fellows

[11] Patent Number: 5,667,456

[45] Date of Patent: *Sep. 16, 1997

[54] CONTINUOUSLY-VARIABLE-RATIO TRANSMISSION HAVING AN IMPROVED STARTING ARRANGEMENT

[75] Inventor: Thomas George Fellows, Headington, England

[73] Assignee: Torotrak (Development) Limited, London, England

[*] Notice: The term of this patent shall not extend beyond the expiration date of Pat. No. 5,401,221.

[21] Appl. No.: 374,548

[22] PCT Filed: Aug. 11, 1993

[86] PCT No.: PCT/GB93/01704

§ 371 Date: Jan. 19, 1995

§ 102(e) Date: Jan. 19, 1995

[87] PCT Pub. No.: WO94/04849

PCT Pub. Date: Mar. 3, 1994

[30] Foreign Application Priority Data

Aug. 13, 1992 [GB] United Kingdom ............... 9217219

[51] Int. Cl.⁶ .................................................. F16H 37/02
[52] U.S. Cl. ...................... 476/42; 476/10; 476/2; 476/15; 475/214
[58] Field of Search .................... 476/40, 10, 1, 476/2, 15, 42; 475/207, 214; 192/3.29

[56] References Cited

U.S. PATENT DOCUMENTS

| Re. 26,917 | 6/1970 | Dickenbrock | 476/40 |
|---|---|---|---|
| 3,823,613 | 7/1974 | Abbott | 476/40 |
| 5,060,769 | 10/1991 | Yoshimura et al. | 192/3.29 |
| 5,088,352 | 2/1992 | Ishimaru . | |
| 5,248,285 | 9/1993 | Nakano | 476/15 |
| 5,401,221 | 3/1995 | Fellows et al. | 475/214 |

FOREIGN PATENT DOCUMENTS

| 0 413 476 | 2/1991 | European Pat. Off. . | |
|---|---|---|---|
| 62-255651 | 11/1987 | Japan | F16H 15/38 |
| 4-300449 | 10/1992 | Japan | F16H 47/00 |
| 6-17915 | 1/1994 | Japan | F16H 15/38 |
| 2 025 545 | 1/1980 | United Kingdom . | |

OTHER PUBLICATIONS

Patent Abstracts of Japan, vol. 10, No. 301 (M–525)(2357) 14 Oct. 1986 & JP,A,61 112 857 (Daihatsu Motor Co Ltd) 30 may 1986 see abstract.

Patent Abstracts of Japan, vol. 10, No. 286 (M–521)(2342) 27 Sep. 1986 & JP,A,61 103 055 (Daihatsu Motor Co Ltd) 21 May 1986 see abstract.

*Primary Examiner*—Charles A. Marmor
*Assistant Examiner*—David M. Fenstermacher
*Attorney, Agent, or Firm*—Davis and Bujold

[57] ABSTRACT

A continuously-variable-ratio transmission ("CVT"), especially of the toroidal-race rolling-traction type, in which the prime mover is connected to the ratio-varying component ("variator") by a torque converter or other starting device capable of slip. The CVT output is connected both to the variator output and also, by way of fixed ratio gearing and a one-way clutch, to the output of the starting device. At low speeds drive is transmitted from prime mover to the CVT output by way of the fixed ratio gearing in both forwards and reverse. In forward drive, as the speed of the variator output rises, operation of the one-way clutch causes the drive transmission path to change from the fixed ratio gearing to the variator output once the speed of the latter exceeds the former. Where the variator is of the toroidal-race type, further one-way clutch means may be included to ensure that the fixed ratio gearing components can rotate in one direction only, thus preventing them from imposing reverse rotation upon the essentially unidirectional variator components.

12 Claims, 1 Drawing Sheet

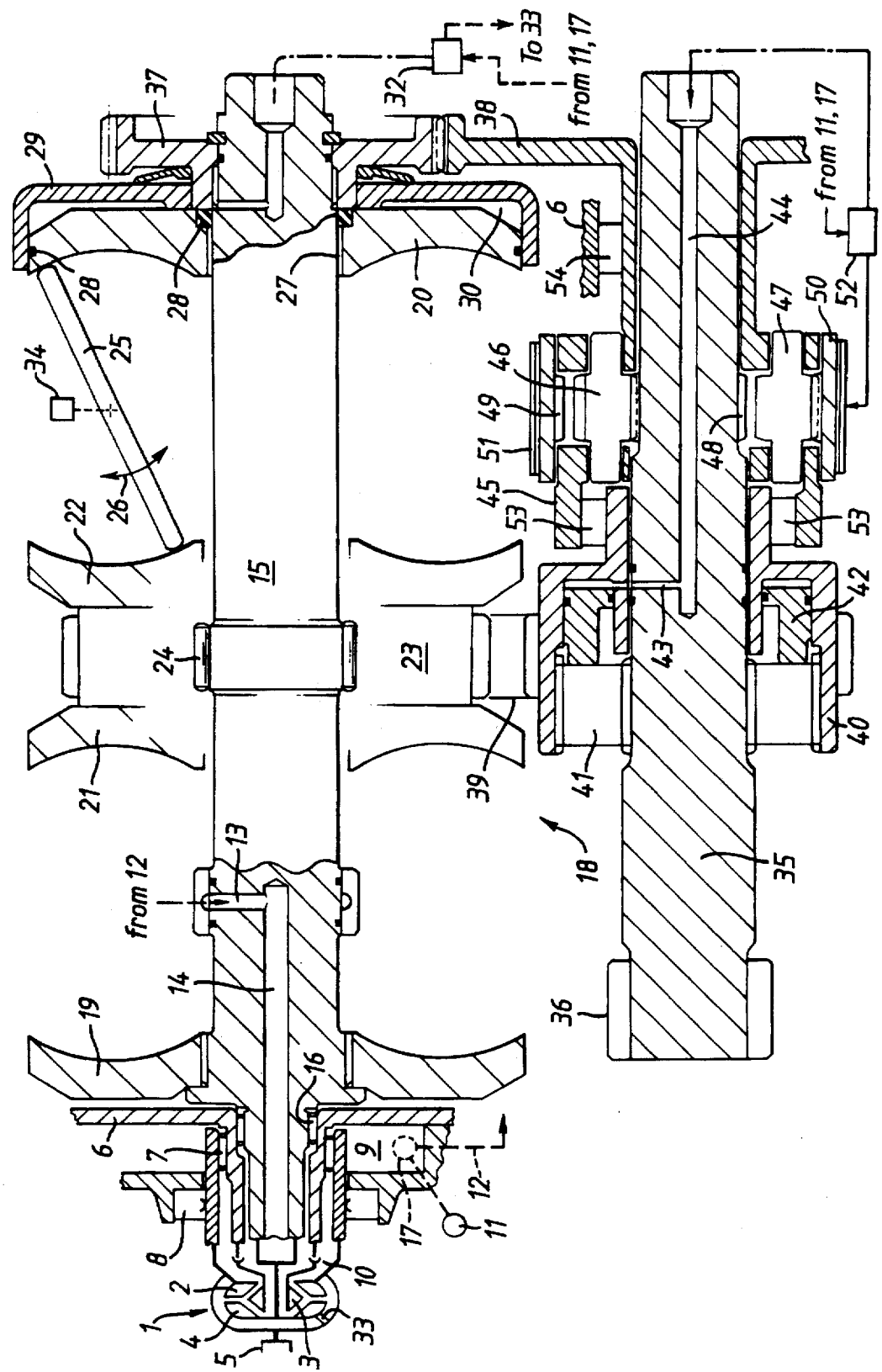

CONTINUOUSLY-VARIABLE-RATIO TRANSMISSION HAVING AN IMPROVED STARTING ARRANGEMENT

This invention relates to CVT's, that is to say to continuously-variable-ratio transmissions, for transmitting power at a variable speed ratio between the rotary output of a prime mover and a rotary point of use. While it relates to such transmissions generally, it relates in particular to automotive vehicles.

The steplessly-variable ratio varying units (variators) of many known types of CVT are incapable of achieving zero ratio, that is to say zero output speed in response to finite input speed. This has led many designers to include within the CVT, in addition to the variator, a starting device typically in the form of a torque converter or other hydrokinetic coupling. When the prime mover is started from rest, it is connected to the driven wheels by way of the device and a gearing unit, and the variator is disconnected from the drive train. The characteristics of the coupling are such that when the impeller rotates at idling speed, insufficient torque is transmitted to the turbine to rotate the downstream gearing and the wheels or other driven members. In such transmissions it is then customary to maintain the variator disconnected when the throttle is first opened so that the prime mover accelerates the coupling impeller to apply enough torque to the turbine to move the wheels away from rest, either forwards or in reverse. As the throttle then continues to open, it is well known in the art that the speed of rotation of the turbine rises towards equality with that of the impeller. As that equality is approached, it has been customary in transmissions of this type to connect the variator, which is directly coupled to the prime mover, to the output and, by raising the variator ratio, to transfer power from the gearing unit to the variator.

Patent specification GB-B-2025545 describes a transmission of this kind. However, because there are two concentric input shafts to the transmission—one directly from the prime mover to the variator and the other from a hydrokinetic coupling (or its equivalent) to the fixed ratio gearing—the location of the principal components is constrained. This can present a problem, particularly when a variator of the toroidal-race rolling-traction type is used in place of a belt because of its greater axial length.

A key feature of a CVT according to the present invention is that the variator should, whenever the control force applied to it falls to zero, seek a ratio equal to that of the fixed ratio gearing. CVTs according to the present invention are thus to be contrasted with those described in patent specification U.S. Pat. No. 5,088,352 in which, in the absence of control forces applied hydraulically to the pulley sheaves of the V-belt variator by their loading cylinders, the variator automatically tends to remain at whatever ratio it is already at, rather than seek the ratio of the associated fixed-ratio gearing. The variators of the present invention and U.S. Pat. No. 5,088,352 therefore behave quite differently, when control pressure is relaxed. One consequence of this, for variators according to the present invention, is that it becomes possible to arrange for the CVT to transmit drive in a forward sense—which it will do for the majority of the time, in a typical automotive application for example—by including just a single one-way clutch and a single hydraulic or other engageable clutch between the variator and the CVT output. Operation in forward drive of the mechanism described in U.S. Pat. No. 5,088,352 is not possible without a one-way clutch and two hydraulic clutches in the corresponding part of the CVT.

In addition it is not easy to adjust the ratio of a ratio-controlled variator so that the variator can take over the drive from the fixed ratio gearing without shock. A torque-controlled variator, on the other hand, will move automatically to a ratio which is synchronous with that of the gearing and the two can thus be used in parallel, i.e. with a single input shaft, and without a separate clutch for the variator. Flexibility of installation is thus improved: for instance the axial sequence of the principal components (coupling, gearing, variator) can be changed.

For overall efficiency, a conventional lock-up torque converter can be used as the starting device, the lock-up clutch preferably being engaged just before power is transferred to the variator—and vice versa.

The invention will now be described, by way of example, with reference to the accompanying drawing, which shows a CVT partly schematically but mainly In a section including the axes of both the variator and a layshaft.

A torque converter 1 comprises an impeller 2, a stator or reactor 3 and a turbine 4. Impeller 2 is connected to a prime mover 5. Reactor 3 is connected through a sprag 10 with the CVT casing 6, which supports a bearing 7 about which the impeller 2 rotates. A seal 8 prevents leakage from the casing 6. Within a cavity 9 in the causing 6 there is a pump 17, supplied from a source 11, which is driven by the impeller 2 and which provides oil under pressure to the variator and clutches (to be described), and also to the converter 1 by way first of a conduit shown schematically at 12, and then by way of drillings 13, 14 formed in a shaft 15, which Is supported by bearing 16 and connected to the turbine 4.

Shaft 15 constitutes the input shaft of a variator 18 of the toroidal-race rolling-traction type comprising opposed input discs 19 and 20, and oppositely-facing output discs 21 and 22 mounted on a ring-shaped output member 23 which rotates on bearings 24 about the input shaft 15. Rollers 25 (of which only one is shown in outline), whose orientation is variable by control mechanism 34 as indicated by arrow 26, transmit drive at variable ratio between the input and output discs, by way of thin fluid films established at the roller-disc interfaces, in a manner well understood in the art. Disc 19 is fixed to shaft 15 but disc 20 is splined to it at 27, so that disc and shaft rotate together but are capable of limited relative axial movement. Disc 20 carries ring seals 28 and constitutes a piston within a cylinder constituted by an end housing 29. The cylinder cavity 30 is connected to fluid source 11 and pump 17 by way of a control mechanism 32 which also controls the operation of a lock-up clutch 33 interposed between the impeller 2 and turbine 4 of torque converter 1. Clutch 33 is operable to remove the facility for slip between the impeller and the turbine. When commanded by 32, pump 17 delivers fluid at pressure into cavity 30 and thus exerts end load upon the discs and rollers of variator 18, so that the variator is capable of transmitting drive. The same pressure is applied to the roller control mechanism 34 to generate torque at the input and output of the variator.

A layshaft 35, lying parallel to shaft 15, carries a final drive pinion 36 which constitutes the output member of the CVT and will typically be connected to driven wheels by way of a final drive gear and differential, those further parts not being shown. Shaft 15 is permanently connected to fixed-ratio reduction gearing 37–38, the gear 38 being rotatable about layshaft 35. By way of a chain 39, variator output member 23 drives a ring 40 which is also rotatably mounted on layshaft 35, but which can be locked to that shaft by engagement of a clutch 41, the piston 42 of which is controlled by mechanism 52 and connected to pump 17 by way of drillings 43, 44 in the shaft 35. End 45 of gear 38 is formed to act as the carrier of double planets 46, 47 engaging both with a sun gear 48 formed on shaft 35 and with an annulus gear 49 formed on a ring 50 in contact with a band brake 51 also controlled by mechanism 52. A first sprag or other form of one-way clutch 53 is interposed between carrier 45 and ring 40, and a second such clutch 54 between gear 38 and casing 6.

When prime mover 5 is first started from rest, with "neutral" or "park" selected, clutches 33 and 41 and brake 51 will be inoperative. If now forward drive is selected by operating control 52 to engage clutch 41, drive will be transmitted to pinion 36 from prime mover 5 by way of the unlocked converter 1, shaft 15, gears 37 and 38, sprag 53, and the engaged connection between ring 40 and layshaft 35. Because there is no pressure initially in the roller control mechanism 34 no torque can be transmitted through the variator which will therefore Idle with the rollers 25 at the same effective ratio (i.e. allowing for the ratio of the chain) as the gear pair 37, 38. If reverse drive had been selected by operating control 52 to engage the reverse brake 51, instead of the forward clutch 41, variator 18 would idle similarly but the final components in the drive train would have been gear 37, gear 38 and attached planet carrier 45, planets 46, 47 meshing with braked ring gear 49, and layshaft 35 by way of sun gear 48. It should however be noted that although the variator 18 is idling and transmitting no power in the two conditions just described, its components are rotating and thus establishing a fluid film between rollers and discs, ready for when power transmission begins.

Because of the one-way operation of sprag 53, reverse drive can be obtained only by way of fixed gearing 37–38, and when brake 51 is engaged. In forward drive, however, as final drive pinion 36 accelerates in response the acceleration of prime mover 5, as already explained the turbine 4 of torque converter 1 will accelerate relative to the impeller 2 until the lock-up position is reached when those two parts are rotating at substantially the same speed. If then mechanism 32 operates to engage clutch 33 and then to cause pump 17 to apply control pressure to the roller control mechanism 34 and to the cavity 30 (so generating variator end load), drive between the prime mover and ring member 40 will transfer from the fixed gearing 37–38 to the output chain 39 from the variator. As the speed of chain 39 increases, due to the reorientation of rollers 25 to a higher ratio, sprag 53 will allow ring 40 to overrun carrier 45, even though gears 37, 38 continue to rotate as before.

The combination of torque converter 1 and parallel clutch 33 therefore represents Just one way of fulfilling the requirement that there must be some component capable of slip which enables the CVT to start from rest, and the desideratum that the CVT should work to maximum efficiency when on the move, especially in overdrive when engine speed is low. Alternatives to the converter 1 include a two-element hydrokinetic coupling (fluid flywheel) with or without a lock-up clutch, a centrifugal or hydraulically-operated friction clutch and a magnetic particle clutch. None of these, however, gives the added feature of torque multiplication at high slip rates provided by a torque converter. Thus, using a torque converter promotes two beneficial effects in particular. Firstly the variator ratio range may be reduced in comparison with what is needed to give the same overall torque ratio range using other starting devices. Secondly the variator need not be subjected to input torques higher than the maximum engine input torque if the lock-up clutch is engaged before variator control pressure is applied in order to transfer the power flow from the fixed ratio path to the variator.

Because variators of the toroidal-race rolling-traction type are essentially unidirectional in operation, the function of the second one-way clutch 54 is to protect variator 18 against any possibility of a reverse rotation imposed upon it through gears 38–37 from the output end of the CVT, for instance in the event of the vehicle rolling backwards with the forward clutch 41 engaged, or forwards with the reverse brake 51 engaged. One-way rotation of variator 18 could be achieved in other ways which by-passed the fixed gearing 38–37, for instance by a sprag between the casing and either ring 40 or shaft 15.

Other advantages of the embodiment shown in the drawing include the following. First, that as the variator 18 synchronises with the fixed gearing automatically prior to the control pressure being applied, there Is no need for any specific clutch to engage it. Secondly, the ease with which the variator and all downstream components can be retrofitted, in substitution for other more conventional transmissions, to any installation comprising a conventional lock-up torque converter fitted directly to the output of a prime mover.

I claim:

1. A continuously-variable-ratio transmission ("CVT") having a rotatable input (15) for connection to a prime mover (5) and a rotatable output (36) for connection to a driven member, comprising:

a starting device (1), capable of slip, connected to the transmission input (15), being connected both to a variator and to a fixed ratio component (37, 38); and wherein a first one way clutch (53) connects the output of the fixed ratio component to the output of the variator, the outputs of the fixed ratio component and of the variator are both connected to the transmission output by a single hydraulic clutch (41), and the variator is controlled by hydraulic pressure, whereby in the absence of hydraulic pressure, due to the connection of the variator output to the fixed ratio component output by way of the first one way clutch, a) the variator seeks the same ratio as that of the fixed ratio component (37, 38), and b) in forward drive the variator and the fixed ratio component, in combination with the first one-way clutch (53), alternately transmit power to the transmission output by way of the single hydraulic clutch (41).

2. A continuously-variable-ratio transmission according to claim 1 comprising an engageable clutch (33) operable to lock the starting device and thereby prevent the starting device from slipping.

3. A continuously-variable-ratio transmission according to claim 2 wherein the starting device comprises a hydrokinetic coupling including an impeller input member (2) and a turbine output member (4), and the engageable clutch is operable to connect the impeller input member and the turbine output member so that the impeller input member and the turbine output member move as one.

4. A continuously-variable-ratio transmission according to claim 2 wherein control of the engageable clutch and the toroidal-race variator is combined whereby engagement of the clutch precedes or is synchronised with the application of operating pressure (via 30, 34) upon the variator.

5. A continuously-variable-ratio transmission according to claim 1 wherein the variator is a toroidal-race rolling-traction variator.

6. A continuously-variable-ratio transmission according to claim 5 comprising means (54) to confine the variator output rotation in one direction only.

7. A continuously-variable-ratio transmission according to claim 6 wherein the means to confine the variator output to rotation in one direction only comprises a second on-way clutch acting upon the fixed ratio component to prevent imposition of a reverse rotation upon the fixed ratio component, which reverse rotation, if allowed, would in turn set the variator into reverse rotation.

8. A continuously-variable-ratio transmission according to claim 6 wherein the components are arranged in a "U"-shaped formation, with the starting device and the variator located in one leg of the "U", the fixed ratio component lies substantially at the foot of the "U", the transmission output lies on the other leg of the "U" near an end position located opposite the fixed ratio component, and the connection between the variator output and the transmission output bridges the two legs of the "U".

9. A continuously-variable-ratio transmission according to claim 1 wherein the fixed ratio component is driven at all times and the fixed ratio component is connected to the transmission output by way of the first one way clutch (53), whereby the fixed ratio component output is overridden by the variator output at higher forward ratios.

10. A continuously-variable-ratio transmission according to claim 1 wherein the fixed ratio component is engageable with the transmission output, for forward drive, by way of the single hydraulic clutch, which forms a forward drive clutch (41).

11. A continuously-variable-ratio transmission according to claim 10 wherein the fixed ratio component is engageable with the transmission output, for reverse drive, by way of a device comprising one of a brake and a clutch.

12. A continuously-variable-ratio transmission according to claim 11 wherein the device comprising one of a brake and a clutch includes epicyclic components (45–49) which engage to connect the fixed ratio component to the transmission output when the device comprising one of a brake and a clutch is engaged.

* * * * *